US011145033B2

United States Patent
Derndinger

(10) Patent No.: US 11,145,033 B2
(45) Date of Patent: Oct. 12, 2021

(54) METHOD AND DEVICE FOR IMAGE CORRECTION

(71) Applicant: Carl Zeiss AG, Oberkochen (DE)

(72) Inventor: Eberhard Derndinger, Aalen (DE)

(73) Assignee: CARL ZEISS AG, Oberkochen (DE)

( * ) Notice: Subject to any disclaimer, the term of this patent is extended or adjusted under 35 U.S.C. 154(b) by 117 days.

(21) Appl. No.: 16/618,925

(22) PCT Filed: Jun. 4, 2018

(86) PCT No.: PCT/EP2018/064635
§ 371 (c)(1),
(2) Date: Dec. 3, 2019

(87) PCT Pub. No.: WO2018/224444
PCT Pub. Date: Dec. 13, 2018

(65) Prior Publication Data
US 2020/0167900 A1 May 28, 2020

(30) Foreign Application Priority Data
Jun. 7, 2017 (DE) .......................... 102017112484.5

(51) Int. Cl.
*G06T 5/00* (2006.01)
*G06T 5/20* (2006.01)

(52) U.S. Cl.
CPC .............. *G06T 5/002* (2013.01); *G06T 5/20* (2013.01); *G06T 2207/10016* (2013.01); *G06T 2207/20021* (2013.01)

(58) Field of Classification Search
None
See application file for complete search history.

(56) References Cited

U.S. PATENT DOCUMENTS

| 7,176,962 B2 | 2/2007 | Ejima |
| 8,577,110 B2 | 11/2013 | Kitamura |
| 8,670,079 B2 | 3/2014 | Adachi |
| 9,516,242 B2 | 12/2016 | Kerwien et al. |
| 9,538,090 B2 | 1/2017 | Spielberg |
| 9,698,919 B1 | 7/2017 | Nielsen et al. |
| 9,897,792 B2 | 2/2018 | Rout et al. |
| 9,978,391 B2 * | 5/2018 | Chen ....................... G10L 25/21 |
| 2002/0110276 A1 | 8/2002 | Kasutani |

(Continued)

FOREIGN PATENT DOCUMENTS

| DE | 69708195 T2 | 8/2002 |
| DE | 102015120967 A1 | 6/2017 |

(Continued)

OTHER PUBLICATIONS

Tolhurst, D. J., et al., "Amplitude spectra of natural images", Ophthalmic and Physiological Optics, Apr. 1992, pp. 229-232.

(Continued)

*Primary Examiner* — Randolph I Chu
(74) *Attorney, Agent, or Firm* — Murphy, Bilak & Homiller, PLLC

(57) ABSTRACT

Methods, apparatuses and computer programs for image processing, in particular image correction, are provided. A sequence of images is processed in this case. Fluctuations, for example as a result of air schlieren, may be recognized and compensated for by identifying a fluctuation signature.

11 Claims, 5 Drawing Sheets

(56) References Cited

U.S. PATENT DOCUMENTS

| | | | |
|---|---|---|---|
| 2004/0005098 A1 | | 1/2004 | Carrano et al. |
| 2006/0088212 A1 | | 4/2006 | Ohmi et al. |
| 2009/0060312 A1 | | 3/2009 | Kitamura |
| 2009/0175505 A1 | | 7/2009 | Muquit et al. |
| 2009/0285478 A1 | | 11/2009 | Thiebaud et al. |
| 2010/0284584 A1 | * | 11/2010 | Maeda .................... G06T 5/002 382/128 |
| 2011/0085074 A1 | | 4/2011 | Sonoda et al. |
| 2012/0288212 A1 | * | 11/2012 | Arrasmith ................. G06T 5/50 382/260 |
| 2013/0216240 A1 | | 8/2013 | Fukuchi |
| 2014/0198984 A1 | | 7/2014 | Chen et al. |
| 2014/0270565 A1 | | 9/2014 | Poyneer et al. |
| 2015/0116705 A1 | | 4/2015 | Harmsma |
| 2017/0048006 A1 | | 2/2017 | Nielsen et al. |
| 2020/0126189 A1 | * | 4/2020 | Derndinger ............. G06F 17/18 |

FOREIGN PATENT DOCUMENTS

| | | |
|---|---|---|
| WO | 2009108050 A1 | 9/2009 |
| WO | 2011139150 A1 | 11/2011 |

OTHER PUBLICATIONS

Carrano, C. J., "Speckle Imaging over Horizontal Paths", SPIE Conference on High-Resolution Wavefront Control, Seattle, WA, Preprint, Jul. 8, 2002, 16 pages.

Fraser, Donald, et al., "Atmospheric Turbulence Visualization with Wide-Area Motion-Blur Restoration", Optical Society of America, vol. 16, No. 7, Jul. 1999, pp. 1751-1758.

Jia, et al., "Motion Blurred Image Restoration", 2013 6th International Congress on Image and Signal Processing (CISP2013), 2013, pp. 384-389.

Lawrence, Taylor W., et al., "Extended-image Reconstruction through Horizontal Path Turbulence Using Bispectral Speckle Interferometry", http://opticalengineering.spiedigitallibrary.org, Optical Engineering, vol. 31 No. 3, Mar. 1992, pp. 627-635.

Lim, Jae S, "Two-Dimentional Signal and Image Processing", Prentice Hall PTR, 1990, 42 pages.

Powell, Mark W, et al., "A Scalable Image Processing Framework for Gigapixel Mars and Other Celestial Body Images", 2010 IEEE, IEEEAC Paper #1533, Version 1, Updated Aug. 5, 2009, pp. 1-12.

Ritter, Joerg, et al., "A Partitioned Wavelet-based Approach for Image Compression Using FPGA's", IEEE 2000 Custom Integrated Circuits Conference, Nov. 16, 1999, 4 pages.

Weigelt, G., et al., "Image Reconstruction by the Speckle-masking Method", Optical Society of America, Optics Letters, vol. 8, No. 7, Jul. 1983, pp. 389-391.

Yamauchi, Hideki, et al., "Image Processor Capable of Block-Noise-Free JPEG2000 Compression with 30frames/s for Digital Camera Applications", 2003 IEEE International Solid-State Circuits Conference, Session 2, Multimedia Signal Processing, Paper 2.5, 2003, 10 pages.

* cited by examiner

METHOD AND DEVICE FOR IMAGE CORRECTION

The present application relates to methods and apparatuses for image correction, and to corresponding computer programs. In particular, the present application relates to such methods and apparatuses that may be used for correcting an influence of air schlieren and/or for image stabilization, in particular for videos, i.e. image sequences, as well. Such image corrections, in which the influences of disturbances such as air schlieren are compensated, are also referred to as image restoration or video restoration.

When optical systems such as telescopes or cameras, for example, are used in the atmosphere, disturbances in the optical imaging of the optical system may occur as a result of air schlieren. By way of example, air schlieren may be caused by solar irradiance, which in turn causes air turbulences. Such optical systems are often coupled to cameras or image sensors in order to facilitate an image recording.

Such air schlieren may lead to flickering, i.e. a movement, in the image and/or to unsharpness in the image, which may be observed through the optical system or which may be recorded by way of the optical system.

An unwanted movement in the image may likewise arise if the optical system is inadvertently moved during the image recording, for example as a result of tremors of an employed tripod. Additional disturbances may occur as a result of a scanning movement in the case of image recording devices that operate on a scanning principle, e.g. have a line sensor that records an object line by line or a sensor with a single pixel that scans an object to be recorded. A so-called slit scan laser scanning microscope (LSM) is an example of a line sensor; an electron microscope or conventional laser scanning microscope is an example for recording a single pixel in conjunction with scanning of an object. Such movements may have translational and/or rotational components; i.e., both a shift and a rotation may occur.

Image disturbances that cause a movement, such as the aforementioned flickering or inadvertent movements of the optical system, are disturbing, in particular, in the case of video recordings as well, i.e. in the case where a multiplicity of successive images are recorded.

In the case of digital image recording using an image sensor, as is usually used these days, there is the option of improving recorded images by subsequent computer-assisted processing. By way of example, there are various approaches for subsequently correcting unwanted movements or flickering by way of appropriate image processing. In some approaches, the flickering is reduced by registering prominent patterns such as prominent edges, for example, in the image. Expressed differently, prominent edges are determined in a sequence of images, for example in a video, and the images are corrected in such a way that the patterns in successive images are aligned. This approach works well if corresponding prominent patterns, e.g. edges, are present in the images, for example if many houses with windows occur. This becomes difficult in nature recordings with bushes, grass, etc., because prominent edges or other suitable patterns are less present or not present at all. If registering prominent patterns does not work in such a case, this may also have negative effects on subsequent sharpening of the images should an employed sharpening algorithm be applied to a plurality of successive images.

A further approach is so-called "Speckle Imaging", which is described for example in C. J. Carrano, "Speckle Imaging over Horizontal Paths", Lawrence Livermore National Laboratory, Jul. 8, 2002. Further information in this respect is found in e.g. G. Weigelt and B. Wirnitzer, OPTICS LETTERS Vol. 8, No. 7, 1983, p. 389 et seq. or Taylor W. Lawrence et al., OPTICAL ENGINEERING Vol. 31, No. 3, p. 627 et seq., 1992. A main disadvantage of speckle imaging is that it requires much computational time or corresponding high-power computers. Originally, speckle imaging was mainly used in astronomy where, at least in many applications, there is sufficient time for image post-processing and/or corresponding computational capacity available. For terrestrial recordings, which are often intended to be carried out in real time, the implementation of such an approach on the basis of the speckle imaging at least requires much outlay since specially designed hardware (e.g. ASICs, application-specific integrated circuits) is required, or it may even be impossible. Moreover, moving objects, such as persons running or motor vehicles driving, for example, are processed just like air schlieren in the speckle imaging algorithm. This may lead to artifacts, in which these moving objects are typically blurred or even disappear in part.

The German patent application having the application number DE 10 2015 120 967.5 discloses a method in which images are subdivided into tiles and the tiles are transformed into the spatial frequency domain. Shifts are identified by evaluating the arguments of the spectral density function of the tiles in the spatial frequency domain and at least a portion of the identified shifts are compensated for, in particular by averaging. The tiles are then inverse transformed into the space domain, and the inverse-transformed tiles are combined. In that case, the averaging is effected in particular separately for argument and absolute value of the spectral density function in the spatial frequency domain.

This approach works well for relatively minor disturbances and low noise. Limitations may occur, however, in the case of more severe turbulences and/or higher noise. In particular, larger, more complex fluctuations in the images at higher frequencies, corresponding to fine structures in the space domain, sometimes cannot reliably be recognized and restored.

Therefore, it is an object of the present invention to provide further improved methods, apparatuses and corresponding computer programs for image correction which yield improved results compared with the abovementioned prior art particularly in the case of larger, more complex fluctuations and/or higher noise.

To this end, a method as claimed, an apparatus as claimed and a computer program as claimed are provided. The dependent claims define advantageous and preferred embodiments.

According to the invention, a method for image processing is provided, comprising:

identifying a fluctuation signature in the spatial frequency domain on the basis of the sequence of images, and restoring at least one image of the sequence of images on the basis of the detected fluctuation signature.

In this case, a fluctuation signature is a characteristic distribution of the spectral density function over a plurality of images in the spatial frequency domain. Typical fluctuation signatures may be ascertained by means of experiments and be assigned to specific image corrections (items of restoration information), which are then applied to the images when the above method is carried out.

In this way, an unwanted movement may be extracted from the sequence of images computationally with comparatively little computational complexity. Compared to e.g. methods operating in the space domain, no registration at prominent image parts such as e.g. edges and the like is required by the treatment in the spatial frequency domain, and so the method may operate robustly even in situations in which such prominent image parts are not present or hardly present. Moreover, it is possible—while complying with the sampling theorem—to carry out the compensation of movements with an accuracy of less than one picture element (pixel), for example in the region of 0.01 picture element. This is often not possible using methods operating in the space domain.

In this case, the sequence of images may be recorded with a short illumination time, which may be so short, in particular, that practically no motion blur occurs, and a high image frequency. In this regard, the illumination time may be less than or equal to $\frac{1}{100}$ s, less than or equal to $\frac{1}{500}$ s or less than or equal to $\frac{1}{1000}$ s, and/or the image frequency may be greater than or equal to 5 images/second, greater than or equal to 10 images/second, greater than or equal to 20 images/second and/or greater than or equal to 50 images/second. In the case of such images, it is possible to evaluate in particular lower frequencies in the spatial frequency domain, which have a high amplitude compared with high frequencies.

In this case, in particular, even greater, more severe or more complex fluctuations may be determined through the use of fluctuation signatures.

The fluctuation signature may be identified on the basis of a comparison of the fluctuation signature in the spatial frequency domain on the basis of the sequence of images with one or more stored fluctuation signatures.

The restoring may then take place on the basis of restoration information assigned to said one or more stored fluctuation signatures.

In this regard, a calibration may be used to stipulate beforehand the fluctuation signals for which the calibration is carried out.

The fluctuation signature may have a plurality of complex-valued points, wherein each point is assigned to an image of the sequence of images. In this regard, the fluctuation signature may describe the behavior of fluctuations over the time of the sequence of images.

The method may further include sharpening over tiles corresponding to one another in the sequence of images prior to or after the combination.

The method may further comprise:
subdividing the images into one or more tiles,
transforming the tiles into the spatial frequency space,
identifying linear shifts in the tiles,
compensating for at least a portion of the identified linear shifts, and
inverse transforming the tiles into the space domain,
wherein the subdividing, the transforming, the identifying, the compensating and the inverse
transforming are repeated $N \cdot N \geq 1$,
wherein the identified linear shifts are stored,
wherein the fluctuation signature is based on the shifts.

A tile size when subdividing the images into tiles may be set depending on the size of air schlieren during the image recording and/or depending on strength of blurring during the image recording.

As a result of the incremental reduction in size, it is also possible, for example, to take account of smaller air turbulence cells and computationally to extract incrementally smaller shifts, further improving the image quality.

A factor by which the tiles are reduced in size may differ between at least two of the repetitions.

As a result of this, it is possible to further reduce the computational complexity by virtue of dynamically adapting the considered tiles to the requirements.

The images may be color images. Here, subdividing, transforming and inverse transforming may be carried out separately for each color channel.

Identifying the linear shift ascertaining a proportionality factor in the spatial frequency domain may comprise fitting a plane in the spatial frequency domain.

The fitting may be carried out on the basis of differences from image to image of the sequence of images.

The method may comprise averaging in the spatial frequency domain over a plurality of images. Noise may thus be suppressed.

The method may further comprise applying a Wiener filter if the fluctuation signature, e.g. on the basis of noise, is not identifiable. Cases of severe noise may thus be taken into account.

One or more method steps of the above-described method may be adapted dynamically depending on the tiles and/or a content of the images. Thus, a flexible approach depending on the requirements is possible.

One or more method steps of the method described above may be carried out in parallelized fashion in order to increase the speed. By way of example, the transformation and/or other described calculations, which may be relatively time-consuming depending on the image size, may be carried out in parallelized fashion. By way of example, it is possible to carry out the calculation for each tile or else for groups of tiles in separate computing devices, e.g. in separate kernels. In other embodiments, the transformation for different lines and/or columns of the image, too, may be carried out in parallel.

In accordance with a further embodiment, an apparatus for image processing is provided, comprising:
a computing device having at least one processor and a memory, wherein a sequence of images is storable in the memory, wherein the processor is configured to carry out the following steps:
identifying a fluctuation signature in the spatial frequency domain on the basis of the sequence of images, and
restoring at least one image of the sequence of images on the basis of the detected fluctuation signature.

The apparatus may be configured to carry out one of the above-described methods.

The apparatus may further comprise an optical system and a camera device, coupled to the optical system, for recording the sequence of images. By way of example, the camera device may have a 2D image sensor, in which n×m picture elements, n, m each >1, are recorded simultaneously. However, it may also have a 1D image sensor (line sensor) or a 0D image sensor (a single picture element) and operate in scanning fashion in order to record a desired object, for example.

Moreover, provision is made of a computer program having program code which, when executed on a computing device, carries out the method as described above.

By way of example, the computer program may be present on a data medium or in a memory, or may be provided via a network.

Below, the invention is explained in more detail on the basis of embodiments, with reference being made to the attached drawings.

Various embodiments are explained in detail below. It should be noted that these embodiments only serve illustrative purposes and should not be construed as limiting. By way of example, embodiments with a plurality of elements or components are presented. This should not be construed as meaning that all of these elements or components are essential for the implementation of embodiments. Instead, other embodiments may also have fewer than the presented or described elements or components and/or may have alternative elements or components. In yet further embodiments, additional elements or components may be provided, for example elements used in conventional optical systems or computing devices. Components or elements of different embodiments may be combined with one another, unless indicated otherwise. Variations and modifications which are described for one of the embodiments may also be applied to other embodiments.

The present invention is concerned with image corrections. Within the scope of the present application, an image is understood to mean an individual image or an image of a video, which is composed of a multiplicity of successive images. In the case of videos, such an image is also referred to as a frame. Within the scope of this application, a sequence of images denotes a sequence of images recorded in succession. By way of example, such a sequence of successive images may be recorded or reproduced as a video, or else as a sequence of individual images recorded in quick succession.

Figure 1:
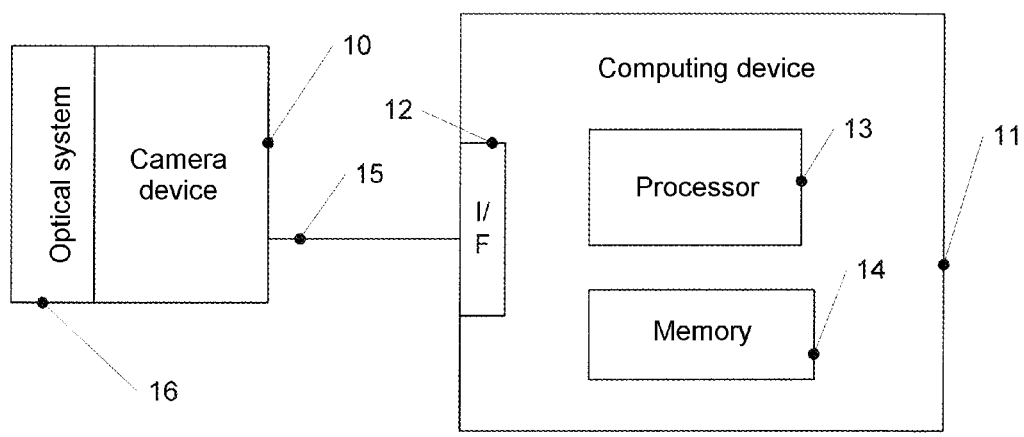
FIG. 1 shows a schematic illustration of an apparatus in accordance with one embodiment.

FIG. 1 shows an apparatus in accordance with one embodiment. The apparatus of FIG. 1 comprises a camera device 10 that is coupled to an optical system 16. The optical system 16 may be a refractor, a telescope or a microscope, for example, the camera device 10 being coupled thereto. In another embodiment, the optical system 16 also may be simply a camera lens of the camera device 10. One or more objects to be recorded are imaged on an image sensor of the camera device 10, for example a CCD (charge-coupled device) sensor or a CMOS (complementary metal-oxide-semiconductor) sensor, by way of the optical system 16. As already mentioned at the outset, the camera device may comprise a 2D image sensor. However, by means of scanning, images may also be recorded line-by-line using a 1D image sensor or point-by-point (0D image sensor). Here, the terms camera device and image sensor should be interpreted broadly and relate to any type of device that may be used to record images of one or more objects; by way of example, they also encompass electron microscopes and laser scanning microscopes (LSM). Consequently, the camera device 10 may record a sequence of digital images by way of the optical system 16. In this case, the sequence of images may be recorded with a short illumination time, which may be so short, in particular, that practically no motion blur occurs, and a high image frequency. In this regard, the illumination time may be less than or equal to $\frac{1}{100}$ s, less than or equal to $\frac{1}{500}$ s or less than or equal to $\frac{1}{1000}$ s, and/or the image frequency may be greater than or equal to 5 images/second, greater than or equal to 10 images/second, greater than or equal to 20 images/second and/or greater than or equal to 50 images/second. In the case of such images, it is possible to evaluate in particular lower frequencies in the spatial frequency domain, which have a high amplitude compared with high frequencies. The images thus recorded with a short illumination time may have comparatively high noise, but that does not significantly hamper the implementation of the techniques described here.

The apparatus of FIG. 1 further comprises a computing device 11, which may comprise for example one or more processors 13 and assigned memory 14, for example a non-volatile memory (e.g. flash memory), random access memory (RAM) or read only memory (ROM). In particular, program code that facilitates the performance of the image corrections described in more detail below when the program code is executed in the computing device 11 on the processor 13 may be stored in the memory 14. The program code may be supplied to the computing device 11 by way of a data medium (memory card, CD or DVD data medium, etc.) or via a network, for example.

In order to be able to process the images received from the camera device 10, the computing device 11 may receive the images by means of an interface 12 by way of a link 15. By way of example, this may be carried out directly via a wired or wireless link, for example if the camera device 10 and the computing device 11 are arranged spatially contiguously, for example in a microscope system. However, it is entirely also possible for the images to be written on a memory card or other storage media in the camera device 10, for example, and for these images then to be transmitted to the computing device 11 from this storage medium. A transmission via computer networks, for example the Internet, optionally also with one or more relays, is also possible. The images may be processed in the computing device near instantaneously immediately after the images are recorded, in particular in real time as well, or else this may be carried out in a temporally separated manner. In other embodiments, the computing device 11 may be integrated in the camera device 10, for example within a video camera. Consequently, the illustration in FIG. 1 does not imply any special spatial relationship between the camera device 10 with the optical system 16 on the one hand and the computing device 11 on the other hand.

In particular, the computing device may carry out a series of processing steps with a recorded sequence of images, which are explained in more detail below with reference to FIG. 2. As already explained, these steps may be implemented by means of appropriate programming of the processor 13. Here, the processor 13 may be a universally usable processor such as a CPU, or else, for example, a specific graphics processor or any other processor or a combination thereof. Specific graphics processors are often used within cameras, for example, while general processors are often used for image processing on a computer, for example. The implementation of the present invention in this respect is not restricted to any special arrangement. In principle, it is likewise possible to implement the image processing described below by means of special hardware components, for example application-specific integrated circuits (ASICs) or field programmable gate arrays (FPGAs).

Figure 2:
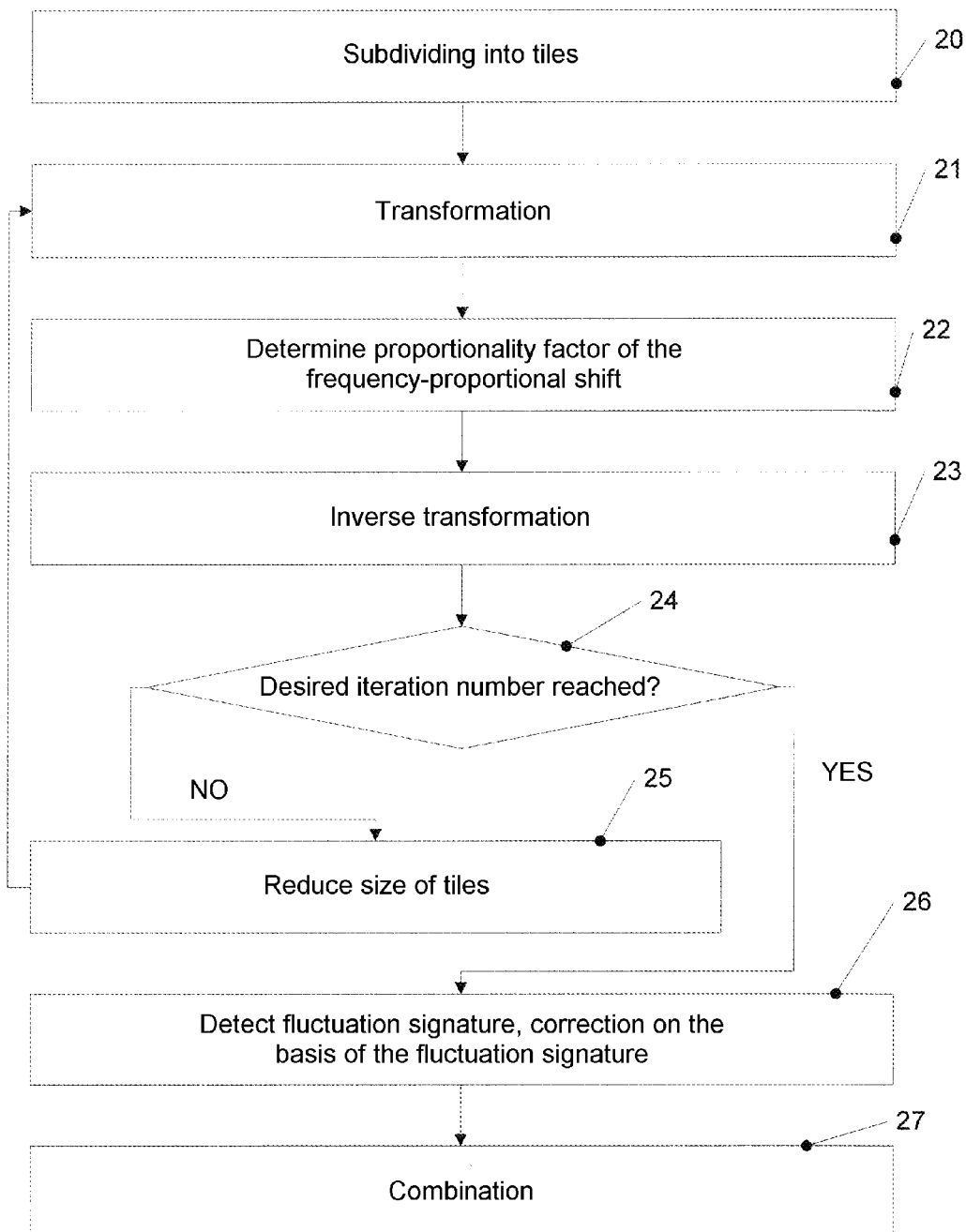
FIG. 2 shows a flow diagram for elucidating a method in accordance with one embodiment.

FIG. 2 shows a flow diagram of a method in accordance with one embodiment which may be implemented, for example as explained above, in the apparatus discussed in FIG. 1, in particular in the computing device 11.

A sequence of images is used to carry out the method. By way of example, in order to process a specific image in the sequence of images, a certain number of adjacent images is used, for example 15 images before and 15 images after the specific image. The specific image may also be referred to as image to be restored. Thus, in order to restore a specific image, a block of 31 images, in particular 31 images recorded in succession, would be used in this example. The number of 15 images before and after the image to be restored, however, only serves as an example and any other number may be used, too, depending on available images and available computing power. Here, the number of used images before and after the image to be restored need not be equal. The images are preferably recorded in quick succession with a relatively short temporal aperture.

In the sequence of images, various events may lead to a change in the image content over time, i.e. from image to image. Here, some of these events are unwanted and may be corrected by the method according to the invention.

Thus, the camera device may carry out a translational and/or rotational movement, which is unwanted in the case of tremors and the like. This movement leads to a corresponding movement in the image content. Also, an entire recorded object may move. Moreover, flickering may be produced by air schlieren disturbances, as already explained above. Finally, only parts of the recorded image may move, too, for example if a movable object such as an automobile or truck is recorded.

The method in FIG. 2, as will initially be explained, is particularly suitable for black/white or grayscale images. A transfer to color images is explained in more detail below.

In step 20 of FIG. 2, the images of the sequence of images are subdivided into tiles, i.e. into partial regions.

Figure 3:
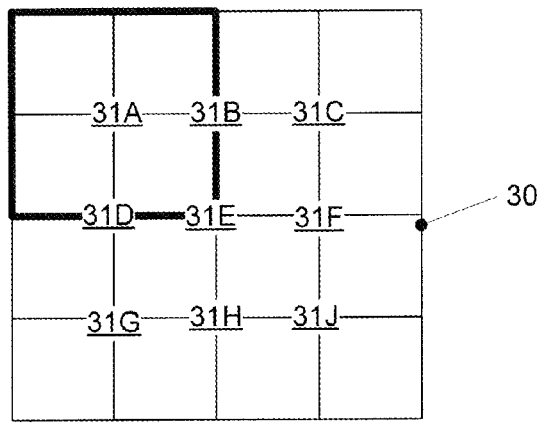
FIGS. 3 and 4 show diagrams for elucidating some steps of the embodiment from FIG. 2.

The subdividing into tiles from step 20 is explained with reference to FIGS. 3 and 4. Here, the tiles preferably have one or more of the following properties:

Where possible, the size of the tiles should be smaller than the largest region of disturbances in the image, for example smaller than the largest cells of air schlieren when compensating for air schlieren.

Shifts of the image as a result of blurring and the like, for example as a result of unstable tripod mounts for a telescope, should be significantly smaller than the size of the tiles, for example at most one half, at most one third or at most one quarter of the tile size.

It should be easy to be able to reassemble the tiles at the end of the method.

By way of example, a tile size for step 20 may be an edge length in the region of one quarter or one eighth of the image size. The tiles may be square. In the case of a typical image with 2048×1024 pixels (picture elements), it is possible, for example, to select a tile size of 256×256 pixels, with other sizes also being possible. Preferably, the tiles overlap in this case in such a way that each pixel not lying in the edge region is present in four tiles. FIG. 3 shows such a subdivision for elucidation purposes. In the example of FIG. 3, an image 30 is subdivided into nine (3×3) tiles 31A-31J. Each tile comprises four of the small squares, with the reference sign being placed at the center in each case. In order to clarify this, the tile 31A is presented in FIG. 3 with a bold outline.

As may be seen, only the pixels in the corners belong to only one tile in this subdivision, other edge pixels each belong to two tiles and pixels in the central small squares each belong to four tiles. Here, FIG. 3 only serves for elucidation purposes and, depending on the image size, the number of tiles may also differ, in particular be greater, for example like in the pixel example above.

The tiles are preferably multiplied by a weighting function. As a result, artifacts during the transformation following in step 21 may be suppressed. Various suitable window functions for this weighting are known per se. The weighting in two dimensions for the case of FIG. 3 is illustrated schematically in FIG. 4. Here, the three tiles are multiplied in each direction by a weighting function 40 in each case, said weighting function dropping off toward the edge of the tile. In the overlapping regions, the weighting functions preferably have a behavior ensuring that the overlapping weighting functions are constant in terms of their sum, e.g. yield 1 (indicated by line 41), such that the tiles may subsequently be unified again to form an overall image by simple addition. Here, the Hanning window function is a suitable window function, wherein other window functions may also be used.

The decomposition into tiles is applied to each image in the sequence of images (e.g. the 31 images in the numerical example above).

It should be noted that if the movement to be compensated for is the same in the entire image or occurs in the entire image, use may be made of only a single tile; i.e., this single tile then comprises the entire image.

Then, in step 21, a transformation from the space domain into the spatial frequency domain is carried out for each of the tiles, with this transformation being a two-dimensional transformation in accordance with the two-dimensional image. In one preferred embodiment, use is made of a Fourier transform, in particular Fast Fourier Transform (FFT). However, it is also possible to use other types of transformation, for example other spectral transformations, on which the precise calculation is then carried out in subsequent step 22. By way of example, use may be made of a wavelet transform. Then, each image in the space domain corresponds to a corresponding spectral density in the spatial frequency domain.

This transformation and/or calculations described below, which may be relatively time-consuming depending on the image size, may be carried out in parallelized fashion in some embodiments. By way of example, it is possible to carry out the calculation for each tile or else for groups of tiles in separate computing devices, e.g. in separate kernels. In other embodiments, the transformation for different lines and/or columns of the image, too, may be carried out in parallel. Thus, for example, a 2D Fast Fourier Transform (FFT) is carried out in two sections, for example initially in a first direction (x-direction, line-by-line) and then in a second direction (y-direction, column-by-column). In each of these two sections, it is possible to carry out such an FFT for the various lines or columns in different kernels or in any other way with different computing devices, for example in 1024 kernels in the case of 1024 lines.

Step 22 then involves determining a proportionality factor of a frequency-proportional shift for the tiles in the spatial frequency domain. In the context of this application, this method is also referred to as "plane fit" and is explained in detail below. In order to simplify the following description, a one-dimensional grayscale image is assumed here, i.e. the image in the space domain may be described by a function i(x). Two-dimensional images are treated correspondingly, except that the computation operations are then carried out in two dimensions. Transformation into the spatial frequency domain yields a frequency-dependent function i(f).

In the following discussion, h(x) denotes a Dirac impulse in the space domain, which determines a shift when applied to the image (i(x)). The Dirac impulse h(x) corresponds to a function H(f) in the spatial frequency domain.

An image shifted e.g. by disturbances is designated by g(x), and the correspondingly shifted image in the spatial frequency domain is designated by G(f). It thus holds true that g(x)=h(x)*i(x) in the space domain, wherein * denotes the convolution operator, or H(f)·I(f)=G(f) in the spatial frequency domain. For a linear shift, the shift rule holds true:

$$i(x - x_0) \circ\!\!\stackrel{F}{-\!\!-\!\!\bullet}\ e^{-i2\pi x_0 f} I(f) \qquad (1)$$

In this case, F denotes the spectral transformation (e.g. Fourier transform) that became for transformation into the spatial frequency domain in step 21. $x_0$ describes a shift, and e is the Euler number of the exponential function. f denotes the frequency. Equation (1) and the above definitions yield:

$$g(f) = h(x) * i(x) \circ\!\!\stackrel{F}{-\!\!-\!\!\bullet}\ H(f) \cdot I(f) = G(f) \qquad (2)$$

As may be seen, the shift in the space domain by $x_0$ corresponds to a change in the argument of the spectral density in the spatial frequency domain. Comparison of the two equations above, equations (1) and (2), also yields |H(f)|=1, i.e. the absolute value of the function H(f)=1, and the argument arg {H(f)} is proportional to −f. This is referred to as frequency proportionality. As is likewise evident, the proportionality factor is a measure of the shift $x_0$. By determining the argument, it is thus possible to determine the shift $x_0$ for the respective tile.

Figure 5:
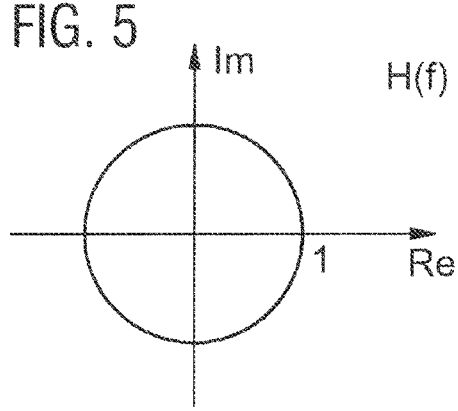
FIG. 5 shows a diagram for elucidating a function in the spatial frequency domain.

FIG. 5 illustrates the function H(f) with absolute value 1 (circle having radius 1 in the complex plane illustrated in FIG. 5) and an argument that determines the position of a function value on the circle.

Figure 6:
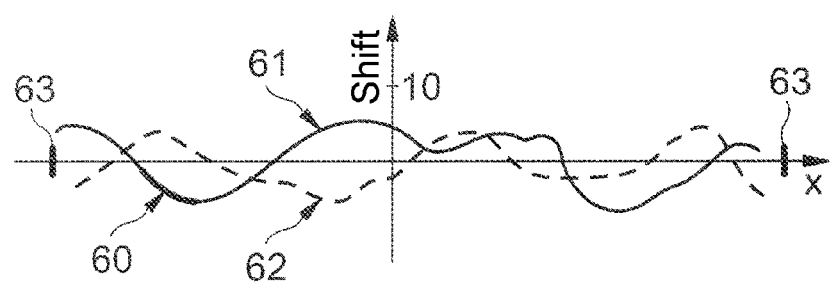
FIG. 6 illustrates a shift of the image content for two images in one dimension.
Figure 7:
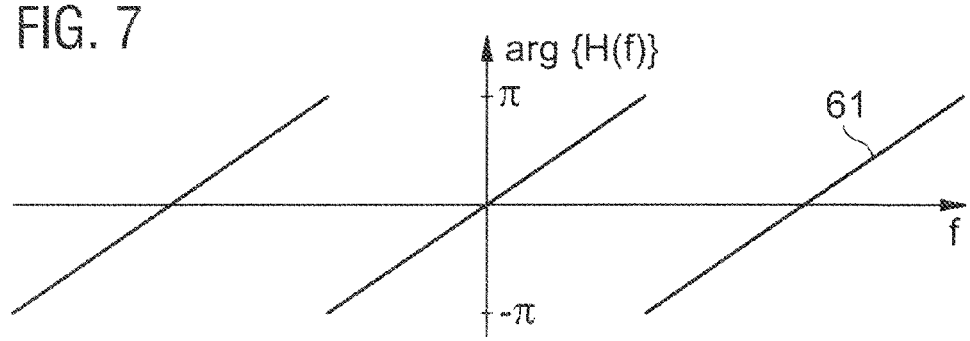
FIG. 7 shows a diagram for elucidating a determination of a proportionality factor.

Examples of shifts are illustrated graphically in FIG. 6. In FIG. 6, curves 61, 62 show examples of the shift in multiples of the pixel spacing against the coordinate x for two different images i(x) of a series of images that was recorded for the method from FIG. 2. In this case, image contents may be shifted by a multiple of a pixel spacing of the image (or by π at the highest frequency) in the spatial frequency domain. 63 denotes the image ends, and 60 denotes one example of a region in which a plane fit is carried out for a tile. Proceeding from the total image size between the image ends 63, the images are decomposed into tiles in step 20 of the method in FIG. 2. In the first decomposition, a tile in one example is of the same size as the region 60. A plane fit is then carried out for this region (and also for other tiles corresponding to other regions). FIG. 7 shows one example 61 of the argument of the function H(f) against the frequency; in this case, the gradient of the curve 61 corresponds to the proportionality factor $x_0$, i.e. to a shift. In the case of more complex shifts, for each tile size in the one-dimensional case, an average gradient is determined for example by fitting a straight line, which corresponds to fitting a plane in the two-dimensional case (i.e. for two-dimensional images). Therefore, this way of determining the shift may also be referred to as plane fit.

In this case, there is present for each image of the sequence of images for the tiles G(f) transformed in the spatial frequency domain, that is to say $G_1(f)$, $G_2(f)$ . . . , wherein the index denotes the image number in the sequence of images. In each case $H_n(f)$ then has to be determined (wherein n in turn denotes an image number). It is firstly assumed here that I(f) remains invariable from image to image, i.e. the image is static apart from disturbances. Taking account of moving components in the images will also be explained later.

Differences arg $\{G_n(f)\}$−arg $\{G_{n-1}(f)\}$ are then calculated in each case, said differences indicating the fluctuations from image to image. As explained above, H(f)·I(f)=G(f), and the multiplication of the complex values H(f) and I(f) corresponds to a multiplication of the absolute values and summation of the arguments. Since the absolute value of H(f) is equal to 1, as explained, this difference formation thus ascertains the function H(f) which identifies the shift from one image to the next image.

In other words, a respective linear shift is ascertained for the respective tiles in step 22 of the method. This linear shift is then extracted computationally for the tiles.

Step 23 then involves inverse transforming into the space domain, for example by means of an inverse Fourier transform.

A check is carried out in step 24 as to whether a desired iteration number of calculations has been reached. If not, tiles that are reduced in size are used in step 25 (the tile size is halved, for example) and steps 21 to 23 are run through again with the reduced tiles.

Figure 8:
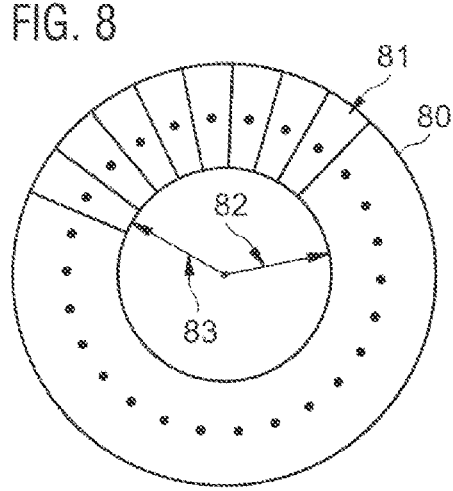
FIG. 8 shows data storage in a circular buffer in the method from FIG. 2.

The plane fits are thus carried out with incrementally smaller tiles. In this case, the shift found is passed on from tile plane to tile plane. In this case, the ascertained shift, i.e. the ascertained proportionality factor in the plane fit, is stored for each iteration. By virtue of the fact that the linear shift found is extracted computationally for each plane fit, in the case of the respectively smaller tiles a residual fluctuation from image to image even at the highest frequencies remain at less than ±π in the spatial frequency domain. In this case, the treatment and storage of the images may take place in a circular buffer, such as is illustrated schematically as a circular buffer in FIG. 8. FIG. 8 shows a circular buffer 80. A pointer 83 points to an image position (i.e. to an image of a sequence of images) which is currently being updated. A pointer 82 points to a position of the result of the image restoration, for example vis-à-vis the position which is currently being updated. Memory locations 21 store everything needed for the progression of the method with respect to this image, in particular including shifts which contain in each iteration in step 22. In some embodiments, during the updating, too, an old portion may be subtracted from the average value and a new portion may be added thereto in order to avoid a complete recalculation of the average value. Such an average value may generally be used to reduce noise. In this regard, by way of example, |G(f)| may be averaged over all or a plurality of images of the respective sequence of images, for example over 31 images in the numerical example above. In the case of an implementation by means of the circular buffer 80 in FIG. 8, in the case of an implementation for each target (pointer 82) it is possible to carry out an averaging over all the images in the circular buffer 80. In this case, the entire averaging is carried out for each target. In an alternative, an old value $|G_k(f)|/31$ (in the case of 31 images) is subtracted from the average value and a new value $|G_i(f)|/31$ is added thereto, wherein i is the index of the image which drops out of the averaging as the pointer "moves on", and k is the index of the image which is added. The computation time may thus be reduced.

The following should also be noted with regard to the plane fit:

The absolute values of I(f) typically decrease from the origin with increasing absolute value of the frequency f distinctly by a plurality of powers of ten up to a highest detected, upper frequency. Therefore, in embodiments, for the plane fit, use is made only of the values of G(f) at low spatial frequencies, since noise may predominate at high values.

At medium and high absolute values of the frequency, it may happen that arg $\{G_n(f)\}$ -arg $\{G_{n-1}(f)\}$ is no longer in the value range of $\pm\pi$.

The multiplication by the weighting function (FIG. 4) in the space domain is a convolution in the frequency domain, which convolution alters the argument of G(f) and, with regard to the plane fit, may corrupt primarily H(f) at low absolute values of the frequency.

The above aspects may make the plane fit more difficult. In order to solve or alleviate these problems, various measures may be taken in embodiments of the invention:

For each tile size, use is made of the function G(f) only at lower frequencies below a frequency threshold, which may be determined experimentally in the context of a calibration.

Very low spatial frequencies below a further frequency threshold, which may likewise be determined in the context of a calibration, are not used.

Figure 4:
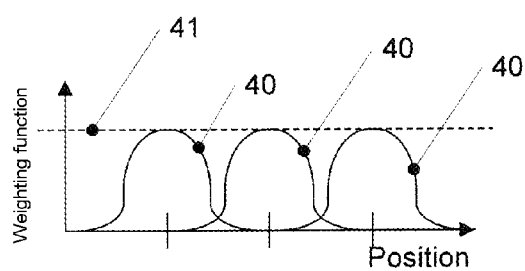

The weighting function in FIG. 4 is chosen in a suitable manner.

In some embodiments, if portions at lower spatial frequencies of the fluctuation change only slowly over time, differences from one image to a next image of a sequence of images may be used for the plane fit, which may reduce a number of stages in tile formation, i.e. a number of iterations of the loop in FIG. 2.

After the last iteration of steps 21-23 of the method in FIG. 2, as residual fluctuation plus rotation portions, which are not covered by the linear shifts compensated for by plane fits, a value range of the argument of less than $\pm\pi$ remains, to which are added the fluctuations ascertained for the larger tiles with the plane fits with the shifts by a few $\pm\pi$. Afterward, step 26 then involves detecting a fluctuation signature and carrying out compensation on the basis of the fluctuation signature. One example of such a fluctuation signature for a frequency f is given in FIG. 9. At a spacial frequency f, the values Gn(f) may be calculated from I(f) by multiplication by the fluctuation signature (wherein here Gn(f) is defined more generally than in equations (1) and (2). Here Gn(f) is the result of the fluctuation signature, not just of the linear shift as in equations (1) and (2), that is to say denotes the image in the spatial frequency domain with all image disturbances which influence the fluctuation signature). The absolute value of the complex fluctuation signature is plotted on the abscissa, and the argument of the complex fluctuation signature is plotted on the ordinate, wherein the arguments for higher frequencies have a value range of –two or more $\pi$ to +two or more $\pi$, wherein one $\pi$ at the highest frequency corresponds to a shift by one pixel in the space domain. The individual points of the fluctuation signature are thus assigned to different Gn(f). The smallest absolute values typically lie in the range of 0.3 to 0.1; the greater the air turbulences, the lower the absolute values.

In order to identify the fluctuation signature, a multiplicity of typical fluctuation signatures may be stored as a result of calibration measurements, which are explained briefly further below, and a fluctuation signature may be identified by a present fluctuation signature being compared with the stored fluctuation signatures. After the fluctuation signature has been identified, that spectral density value which belongs to the value 1 of the fluctuation signature is entered into the restored spectral density. This value corresponds to the average value during averaging, as mentioned in the patent application DE 10 2015 120 967.5 cited in the introduction. As explained above, the values $G_n(f)$ may be calculated proceeding from I(f) by multiplication by the fluctuation signature. If then conversely, for a frequency, the values $G_n(f)$ are known (as a result of spectral transformation of the recorded images) and a matching fluctuation signature has been identified, the value I(f) results at the point with absolute value 1 and argument 0 of the fluctuation signature (cf. FIG. 9). This is the value sought and is entered as restoration result e.g. into the circular buffer 80 from FIG. 8. In general, the fluctuation signature extends like a cloud over a certain number of images, over many or else all of the spatial frequencies of a current smallest tile used in the method, or else over all smallest tiles. For an even better implementation, the content of the entire circular buffer may be used (that is to say not just a certain number of images) in order that the restoration at a frequency f is carried out with further improvement. In this case, for the sake of simplicity, the restoration has been explained here for a frequency f in the one-dimensional case. In the case of two-dimensional images, the frequency f should be replaced by a two-dimensional frequency $f_x$, $f_y$ for a respective smallest tile i,j (i, j are the coordinates of the tile) of a respective image. Each fluctuation signature is thus assigned a spatial frequency fx, fy of a tile and of an image at which the restored spectral density value is entered into the restoration result.

A distance in the complex plane from image to image may also be taken into account in the fluctuation signature. In the example in FIG. 9, each "point" may be assigned a number of a respective image in the sequence of images. On the basis of this, in one embodiment, each or almost each point may be assigned a distance in the complex plane in FIG. 9 with respect to a point of a previous image, either as a complex difference or as a difference between the arguments. On this basis, it is possible to take account of how distinct the fluctuation is from image to image, as a result of which the restoration may be improved further.

For relatively short time segments, for example minutes, the fluctuation characteristic in the case of image disturbances remains typically unchanged, and a limited number of images is sufficient for detecting the fluctuation signature, for example images recorded during one second. In this case, it is possible to use a weighting function which takes into account with lower weighting the values from images at the start and at the end of the time segment over which the images are recorded. After a relatively long time, for example after half an hour, the fluctuation signature may change, for example on account of a change in thermal irradiation and turbulences associated therewith.

The fluctuation signature is initially multi-dimensional. For practical handling and identification there are various possibilities for reducing the complexity of the multi-dimensional fluctuation signature and thus for facilitating processing, which may also be dependent on the intensity and characteristic of the air turbulences. In principle, approaches known from pattern recognition generally may be used.

Figure 9:
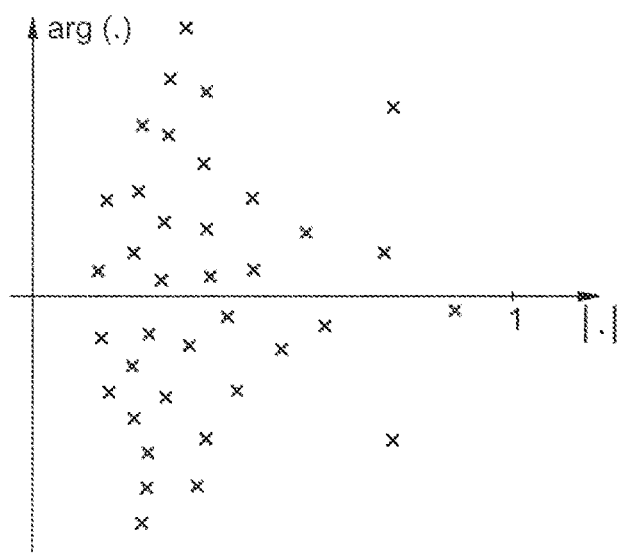
FIG. 9 shows a diagram for elucidating a fluctuation signature.

An example of this is a decomposition into basis functions and scaling values, wherein different scaling values reflect air turbulences of varying intensities. In many cases it may be sufficient to take account of only a small number of dimensions (e.g. dependencies), as illustrated in FIG. 9. In FIG. 9, in particular, only one dependence from image to image is taken into account, which generally yields good results. However, it is also possible to take account of other dependencies, dimensions and/or items of information, which arise e.g. from all data in the circular buffer 80.

As already mentioned briefly, by means of separate experiments and calibrations, it is possible to clarify which complex value is intended to be used, and for which recognized fluctuation signature it is intended to be used, as restoration result at the end instead of the conventional averaging. This procedure includes compensation of contrast losses as a result of air turbulences, but also as a result of the optical imaging, with the approach of Wiener inverse filtering. The fluctuation signature is typically dependent on the intensity of air turbulences, the distance between object and objective (lens), the position in the image and the recorded scene.

The use of fluctuation signatures instead of a conventional averaging over argument (and optionally absolute value) is more robust and less sensitive to noise. Moreover, the use of fluctuation signatures facilitates the separation of effects brought about by air turbulences from effects of moving objects. Besides air turbulences, it is also possible to compensate for movements of camera and objectives (lenses) caused for example by wind or small inadvertent camera pans.

With respect to the fluctuation signatures may be obtained in various ways in the context of the calibration mentioned above. By way of example, a typical scene may be recorded at different intensities of air turbulences from no turbulences up to the strongest turbulences that occur. Without air turbulences, the image is recorded which is then substantially the target of the restoration. As turbulences intensify, the different fluctuation signatures then occur, which are related to the restoration target, i.e. a check is made to establish which restoration processes are necessary in order to arrive at the target image from the image recorded with the turbulences. Both are stored, the fluctuation signature and the relationship to the restoration target, wherein the fluctuation signatures, as mentioned above, may be decomposed into basis functions and scaling values.

This also involves stipulating the steps in which the decomposition of the images into tiles, optionally becoming smaller and smaller, is intended to be performed later during the restoration. This is influenced by the strength of the air turbulences. As a consequence thereof, in embodiments, the tile size is reduced step by step such that fluctuation signatures which extend over many $\pi$ may still be reliably detected later during the restoration.

It should be noted that different fluctuation signatures may occur in different image regions.

In some embodiments, it is possible to carry out a plane fit in respect of the change of the argument according to the shift rule from image to image in the spatial frequency domain in order to compensate for the disturbing movement and, additionally, to determine a movement to be separated (i.e., a movement that is actually present, for example as a result of the movement of a recorded object). This may be used in the case of 2D image sensors, in particular. By way of example, a movement to be separated may be present if video recordings are made from an airplane. Then, the movement to be separated is caused by the movement of the airplane. A similar statement applies in the case of other vehicles. Such a movement may also occur in the case of other applications, for example in the case of a surgical microscope, for example in respect of a movement of a surgeon with his/her instruments in relation to a movement of a microscope head over the patient at rest (which is intended to be compensated for, for example).

A plurality of tiles are preferably used if there is movement only of some image parts. Thus, it is possible to treat image parts with moving objects differently than image parts without such objects. In the process, it is possible to maintain a movement of objects to the best possible extent, while unwanted movements are compensated for. The number and size of the tiles may be adapted dynamically in the process, for example by using pattern recognition methods to recognize where and in which tiles moving objects occur.

In order also to take account of a movement of part of the recorded image (for example of an automobile or a truck), it is possible, in some embodiments, to leave tiles in which such an occurrence was identified, for example on the basis of a relatively large movement in the respective image part, unchanged (unrestored). In order to take account of such effects even more accurately, it is also possible to use tiles that are small in comparison with the size of air turbulences. Here, use is made of tiles that are adjacent in time and space in order to identify movements of only parts of the image and in order to subsequently carry out a compensation where necessary.

If it is thus recognized that only flickering as a result of air schlieren occurs in a tile, this may be compensated for as described above, i.e. by means of plane fits and fluctuation signatures.

If it is recognized that flickering is present in a tile and moreover a moving object is present in its entirety in the tile, these may be separated from one another by considering the dependence over time since flickering causes fluctuations while the shift increases linearly, for example in the case of a movement. By way of this separation, it is then possible to correct only the fluctuation over time caused by flickering.

If it is recognized that, in addition to flickering in a tile, there is a moving object only partly in the region of the respective tile, it is possible to ascertain how the shift over time by flickering is in adjacent tiles by analysis thereof. This shift may then be interpolated for the current tile and subsequently be used for compensation purposes. By way of example, the shift from adjacent tiles may be averaged. Then, compensation is carried out once again on the basis of the shift rule with a frequency-proportional factor.

In addition to the above-described operations on the image, further conventional methods may also be applied, for example image sharpening. Moreover, the method described may also be corrected using the methods described in DE 10 2015 120 967.5.

A threshold may be set for recognizing the fluctuation signature. This threshold may determine the point to which a signature is deemed to be recognized, i.e. how similar to a stored signature a signature present must be. If a signature may no longer be recognized within said threshold, for example owing to severe noise, the absolute value to be restored is set to 0 in order to remove informationless noise from the image. That is to say that essentially a Wiener filter is applied to the image.

As mentioned, the method of FIG. 2 may initially be applied to black/white or grayscale value videos. However, an extension to color videos or other colored sequences of images is possible. In one embodiment, the subdivision into tiles and the transformation or inverse transformation (steps 20, 21, 23 and optionally 25 in FIG. 2) are carried out separately here for different color channels. By way of example, in the case of a sequence of RGB (red, green, blue) images, these steps are carried out separately for the red channel, the green channel and the blue channel. Steps 22 and 26 may then be carried out on grayscale values that are formed on the basis of the red, green and blue components. By way of example, a spectral density for grayscale values is formed in step 22 from the spectral densities for the red, green and blue channels by averaging, and changes to be carried out in the argument of the spectral density, as described above, are then ascertained on the basis of this spectral density for grayscale values. These changes may then be applied to the spectral densities for the red, green and blue channels.

Here, the averaging may also be carried out as weighted averaging. By way of example, it is possible, in the process, to take account of the fact that the human eye is more sensitive to green light than to red or blue light, and so the green channel may be weighted more highly than the red or the blue channel. A similar procedure may be carried out with the averaging and/or sharpening of step 26.

Moreover, the method of FIG. 2 may be extended in some embodiments as mentioned to the effect of being able to distinguish between "real" movements and unwanted movements (for example as a result of the aforementioned air schlieren). By way of example, such "real" movements may be objects that move through the recorded images, for example a travelling motor vehicle or a moving person.

In some embodiments, it is possible to identify a moving object by virtue of the argument of the spectral density in a tile varying more strongly than in adjacent tiles during the same time interval, for example varying more strongly by more than a predetermined threshold. By way of example, within a time interval, the values of the argument of the spectral density may vary by +/−90 degrees in a considered tile, while the argument during the same time interval only varies by +/−30 degrees in adjacent tiles. From this, it is possible to deduce that a moving object is situated in the considered tiles, while the change in the argument in the adjacent tiles may have been caused by air schlieren and the like, for example.

If this determines that a moving object is situated in a certain tile, various procedures are possible. In some embodiments, such a tile may be displayed simply without restoration (i.e., without carrying out step 22 and/or step 26 for this tile, for example). In other embodiments, the components of the changes of the argument of the spectral density for the moving object and for the flickering, for example, may be separated from one another in order, for example, only to compensate for the component for the flickering without falsifying the component for the moving object. In some embodiments, this may be carried out on the basis of the size of the change in the space domain. By way of example, the area of large-area flickering, caused by large-area air schlieren, will often be greater than that of small, moving objects. Optionally, this may be carried out on the basis of the tile sizes during the various iterations.

In other embodiments, a distinction is made on the basis of the movement direction. A moving object often moves uniformly or at least in the same direction at all times during a time interval, whereas flickering caused by air schlieren, for example, has a fluctuating character such that the shifts may change the direction in this case. It is also possible to use other properties in terms of which disturbances as a result of air schlieren or other unwanted movements differ from normally moving objects as a basis for the distinction.

As already explained, the embodiments explained above may be applied to a sequence of images, for example images of a video. In this way, it is possible to compensate for disturbances such as air schlieren or tremors. However, it is also possible to output only a single image as the result, as is usual in conventional single image photographic cameras. In this case, a sequence of images is recorded by a camera device such as the camera device illustrated in FIG. 1, said sequence of images comprising the image to be output at the end and a number of images before and after the image in order to be able to carry out the above-described method. Here, such recordings may be recorded with a high frame rate, for example with 300 frames per second. In this way, it is possible in the ultimately output individual image to compensate for a distortion or shifts as a result of flickering as described above, with it optionally being possible to take account of moving objects, as described above. Moreover, it is possible to carry out a sharpening, which is adapted to recognized disturbances, for example air schlieren disturbances.

As mentioned previously, the method of FIG. 2 may also be used for image stabilization, i.e., for compensating for tremors or blurring. Here, it may be sufficient to use only one tile size (i.e., use one iteration of steps 21 to 23 in FIG. 2). In this application, it is typically only the translational shift, i.e. a shift in a certain direction, that is compensated for. To this end, it is possible, as described, to carry out an analysis of the shift (i.e., the change of the argument of the spectral density after the transformation at 21) over time, wherein it is possible to distinguish between shifts on account of tremors and object movements (as described above). Thus, the shift may be compensated for very accurately in some embodiments, in part with an accuracy of less than one pixel.

The invention claimed is:

1. A method of image processing by a computing device, the method comprising:
    calculating a spectral density of each recorded image in a temporal sequence of recorded images, each spectral density comprising a set of spectral density values corresponding to respective spatial frequencies and obtained by applying a frequency-domain transform to the recorded image;
    detecting a fluctuation in the spectral densities across respective ones of the recorded images;
    comparing the fluctuation to stored fluctuation signatures representing characterized disturbances affecting acquisition by an imager that produced the recorded images, each fluctuation signature comprising a set of complex values for each one or more of the respective spatial frequencies, with each complex value corresponding to a respective one of the recorded images;
    responsive to the fluctuation matching one of the stored fluctuation signatures, generating a modified set of spectral density values that is compensated for the characterized disturbance represented by the matched fluctuation signature, the modified set of spectral density values modified in dependence on the matched fluctuation signature; and
    generating a restored image, or at least a portion thereof, by transforming the modified set of spectral density values back into a space domain of the recorded images, to produce a corresponding set of space domain values comprising intensity values for respective pixel positions of the imager.

2. The method of claim 1, wherein the restored image corresponds to an intermediate sequence location in the temporal sequence of recorded images.

3. The method of claim 1, wherein each recorded image is subdivided into a set of image tiles of uniform size having corresponding tile positions encompassing respective regions of the recorded image, and where the steps of detecting, comparing, and generating are performed for each tile position using the spectral density values for the image tiles belonging to that tile position.

4. The method of claim 3, wherein the method includes one or more iterations of subdividing the recording images into image tiles, for detecting and compensating for linear shifts in the spectral density values across the same tile position or positions that are characteristic of movement of the imager during image acquisition, each iteration using a successively smaller tile size, and wherein the steps of detecting, comparing, and generating are performed after a last one of the iterations, using the tile size of the last iteration.

5. The method of claim 3, wherein performing the steps of detecting, comparing, and generating on a per tile position basis, comprises, for each tile position:
  detecting fluctuations in the spectral density values across the image tiles belonging to the tile position;
  comparing the detected fluctuations to the stored fluctuation signatures; and
  responsive to the detected fluctuations matching one of the stored fluctuation signatures, generating a modified set of spectral density values by modifying the spectral density values belonging to the tile position for one or more of the recorded images, using complex adjustment values in dependence on the matched fluctuation signature.

6. An apparatus for image processing, the apparatus comprising:
  a computing device having at least one processor and a memory, wherein a temporal sequence of recorded images is storable in the memory, and wherein the processor is configured to:
    calculate a spectral density of each recorded image in the temporal sequence of recorded images, each spectral density comprising a set of spectral density values corresponding to respective spatial frequencies and obtained by applying a frequency-domain transform to the recorded image;
    detect a fluctuation in the spectral densities across respective ones of the recorded images;
    compare the fluctuation to stored fluctuation signatures representing characterized disturbances affecting acquisition by an imager that produced the recorded images, each fluctuation signature comprising a set of complex values for each one or more of the respective spatial frequencies, with each complex value corresponding to a respective one of the recorded images;
    responsive to the fluctuation matching one of the stored fluctuation signatures, generate a modified set of spectral density values that is compensated for the characterized disturbance represented by the matched fluctuation signature, the modified set of spectral density values modified in dependence on the matched fluctuation signature; and
    generate a restored image, or at least a portion thereof, by transforming the modified set of spectral density values back into a space domain of the recorded images, to produce a corresponding set of space domain values comprising intensity values for respective pixel positions of the imager.

7. The apparatus of claim 6, wherein the restored image corresponds to an intermediate sequence location in the temporal sequence of recorded images.

8. The apparatus of claim 6, wherein each recorded image is subdivided into a set of image tiles of uniform size having corresponding tile positions encompassing respective regions of the recorded image, and wherein the processor is configured to perform the detecting, comparing, and generating operations for each tile position using the spectral density values for the image tiles belonging to that tile position.

9. The apparatus of claim 8, wherein the processor is configured to perform one or more iterations of subdividing the recording images into image tiles, for detecting and compensating for linear shifts in the spectral density values across the same tile position or positions that are characteristic of movement of the imager during image acquisition, each iteration using a successively smaller tile size, and wherein the processor is configured to perform the detecting, comparing, and generating operations after a last one of the iterations, using the tile size of the last iteration.

10. The apparatus of claim 8, wherein, for performing the detecting, comparing, and generating operations on a per tile position basis, the processor is configured to, for each tile position:
  detect fluctuations in the spectral density values across the image tiles belonging to the tile position;
  compare the detected fluctuations to the stored fluctuation signatures; and
  responsive to the detected fluctuations matching one of the stored fluctuation signatures, generate a modified set of spectral density values by modifying the spectral density values belonging to the tile position for one or more of the recorded images, using complex adjustment values in dependence on the matched fluctuation signature.

11. The apparatus of claim 6, wherein the apparatus further comprises an optical system and a camera device coupled to the optical system, for obtaining the temporal sequence of recorded images.

\* \* \* \* \*